METHOD OF MAKING COMPOSITE METAL STRUCTURE

Original Filed Sept. 21, 1964 2 Sheets-Sheet 1

INVENTOR.
EMERY I. VALYI
BY Robert H. Bachman
ATTORNEY

INVENTOR.
EMERY I. VALYI
BY Robert H. Bachman
ATTORNEY

United States Patent Office 3,365,785
Patented Jan. 30, 1968

1

2

3,365,785
METHOD OF MAKING COMPOSITE METAL STRUCTURE

Emery I. Valyi, Riverdale, N.Y., assignor to Olin Mathieson Chemical Corporation, a corporation of Virginia
Original application Sept. 21, 1964, Ser. No. 398,127, now Patent No. 3,230,618, dated Jan. 25, 1966. Divided and this application Aug. 30, 1965, Ser. No. 499,128
2 Claims. (Cl. 29—420.5)

ABSTRACT OF THE DISCLOSURE

A method of making a composite sheet metal—porous metal structure by embedding a first porous body in a second porous body of relatively less porosity and metallurgically bonding the first and second porous bodies to an imperforate metal sheet.

This application is a divisional of copending application Ser. No. 398,127, filed Sept. 21, 1964, now U.S. Patent 3,230,618, which in turn is a division of application Ser. No. 202,612, filed June 14, 1962, now U.S. Patent 3,201,858. The latter application is in turn a continuation-in-part of application Ser. No. 732,663, filed May 2, 1958, now U.S. Patent 3,049,795, which in turn is a continuation-in-part of application Ser. No. 586,259, filed May 21, 1956, now abandoned.

This invention relates to porous fabrications and more particularly to a permeable body integrated to a supporting sheet metal structure adapted to conduct a fluid to the said permeable body for flow and distribution therethrough.

As brought out in the aforesaid co-pending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy" by Dr. Paul Schwarzkopf (the Macmillan Company, New York, 1947) and "Powder Metallurgy" edited by John Wulff (the American Society for Metals, Cleveland, 1942) no economical and efficient method has been found thus far to overcome the limitations above referred to prior to the invention described in the aforesaid co-pending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid co-pending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing copending application, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide means for fabricating novel porous metal structures adapted to distribute a fluid and heat in flow therethrough.

A further object of this invention is to provide a novel method for making porous metal structures adapted to distribute a fluid and heat in flow therethrough.

Other objects and advantages of this invention will become more apparent from the following drawings and description in which FIGURE 1 is a perspective view illustrating one embodiment of the present invention in a preliminary stage of fabrication;

Figure 1:
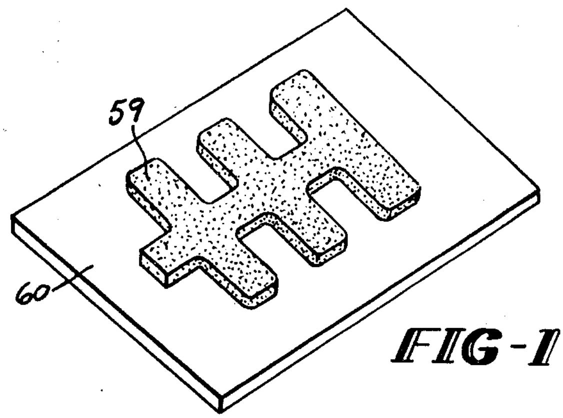

In regard to production of the porous body, it may be obtained by the so-called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e., void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble sustance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the sintered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjuction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

Although a specific mass of sinterable metal has been described, it is pointed out that other formulations of sinterable materials may also be used, as for example those metal oxides, carbides and nitrides, or mixtures thereof, containing if necessary pore or interstice forming materials discussed above.

Various substances are known to be effective in preventing adhesion of one metal body to another, even under severe pressure. as in rolling, at elevated temperatures, as in the course of soaking prior to rolling, or diffusion-annealing, etc. In fact, many substances present in metal as accidental impurities, as for example manganese sulphide in steel, operate to produce seams and other discontinuities in rolled products. Among these substances are graphite, applied for example in the form of colloidal suspensions, boron nitride, talcum, zinc oxide, titania, and many others each within certain limits of applicability that are not relevant here. In fact, it has been noted that on occasion during roll-welding of two superimposed sheets interference with the integration occurs even by the mere presence of an accidental oil smudge on the surfaces of the sheets. For purposes of the present invention, the separation or weld-inhibiting materials employed need not withstand exposure to high pressures or be capable of extending under pressure which normally are requisites of stop-weld resist used in pressure welding. Instead, the weld-inhibiting material employed as the spacer or supporting substance herein need only have reasonable mechanical strength to function as a spacer or support before the superimposed particulate material acquires strength of its own as the sintering operation progresses. The weld-inhibiting material employed as a spacer or supporting substance should preferably be capable of being applied at room temperature as a powder or by spraying, painting, extrusion, etc.; if needed, harden with the least time delay, and remain in place through the better part of the subsequent operations which usually comprise the application of a loose particulate metal layer of transporting the composite preparatory to a sintering operation and of sintering. Moreover, this spacer or supporting substance must be capable of removal following the sintering operation even if the channel network is extremely complex and tortuous.

Preferably the spacer for supporting substances contemplated herein are liquid soluble and have a melting point higher than the sintering temperature of the particulate metal layer, or at least higher than the temperature at which that layer commences to acquire reasonable mechanical strength in the course of sintering. Such soluble substances are for example sodium chloride, which melts at 801° C., a temperature somewhat below the customary sintering temperature of copper; and it may be used in connection with copper aggregate because the latter will acquire adequate strength during sintering before the sodium chloride begins to melt. Other such soluble substances are sodium aluminate (melting at 1,650° C.), potassium sulphate (melting at 1,076° C.), sodium metasilicate (melting at 1,088° C.), aluminum chloride (melting at 1,040° C.), and others. The choice of such soluble spacer or supporting substances will of course also depend on possible solid phase reactions with the metal surrounding them, at the temperatures of sintering. For example, while one of the most effective weld-inhibiting materials adapted for use as the spacer or supporting substance in connection with copper and aluminum alloys is graphite or carbon, austenitic stainless steel would be harmed by that spacer substance through carburizing.

In this respect it is pointed out that also contemplated within this invention is the utilization of a specific form of a carbon as a weld-inhibiting material in the fabrication of these composite structures. The particular form of carbon contemplated is that obtained in situ. from organic substances, by pyrolysis. As is known, progressive elevated temperature exposure of a variety of organic substances in inert or reducing atmospheres results in progressive thermal degradation of the organic material and ultimately in pyrolysis similar to coking. The residual carbonaceous matter is strong and cohesive as well as stable, except under oxidizing conditions at elevated temperatures. The resultant weld-inhibiting material, originally introduced as an organic substance may thus maintain reasonable mechanical strength and its functional integrity not only at room temperature but also throughout the process of heating during the sintering operation, while the powder metal acquires appreciable strength and ability to support itself over a preformed channel forming the groove of the desired composite structure. However, the organic material applied to the solid metal surface or within the preformed channel of a solid metal member, may be used as a weld-inhibiting material only if the carbonaceous residue remaining after the sintering operation is removed. This in turn depends upon the particular metal aggregate applied above it which must be pervious and porous enough to permit the ambient atmosphere to react freely with the contents of the channels. In such a case, the pyrolized organic substance will break down further and oxidize without residue, if the sintering furnace atmosphere is adjusted to allow for progressive formation of gaseous carbon compounds, or, as is preferable, if exposed to air while still hot enough to oxidize vigorously.

For example, a paste-like mixture of silica sand and a phenolic varnish of the resol type may be used. The weld-inhibiting materials so formed can be hardened at room temperature and then upon exposure to increasing temperatures, will progressively harden and cure as is naturally expected for a phenolic resin, and thereafter progress through several stages of heat degradation while heated to still higher temperatures in an inert atmosphere. In a specific application in which sperical copper particles were metallurgically bonded to a copper sheet, during the course of the sintering operation the sand particles remained bonded together due to the carbonaceous residue of the phenolic resin. Upon removal of the sintered composite from the furnace and while still at an elevated temperature approaching that of the furnace, but now exposed to ambient air, the carbon oxidizing almost instantaneously leaving the sand free flowing and devoid of any bond.

Oxidation of the pyrolyzed residue may be accomplished usually by mere exposure to an atmosphere containing sufficient oxygen to burn the carbon, but not enough to oxidize the metal harmfully. In the case of copper, sintering may be followed by air exposure at room temperature, as above described; in the case of stainless steels, if brightness is to be preserved, cooling after sintering may take place in a protective atmosphere which may have just enough oxygen to react with the carbon. A wide variety of such weld-inhibiting spacer and supporting substances are readily avilable and known to the art; and in principle such formulations usually consist of freeflowing comparatively inert granular materials, such as silica sand, bonded with phenol formaldehyde, urea-formaldehyde, polystyrene, polyethylene, furfural formaldehyde, coal tar, etc., or such organic materials alone and others for example, paper, adhesive tape, etc., in the event that only thin films need to be supplied prior to sintering.

Figure 2:
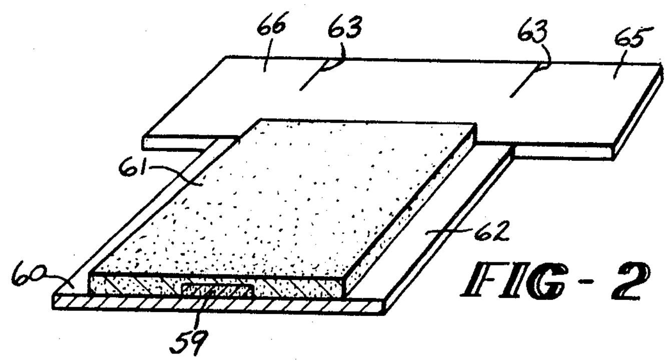
FIGURE 2 is a perspective view of one embodiment of the present invention in a subsequent stage of fabrication.
Figure 3:
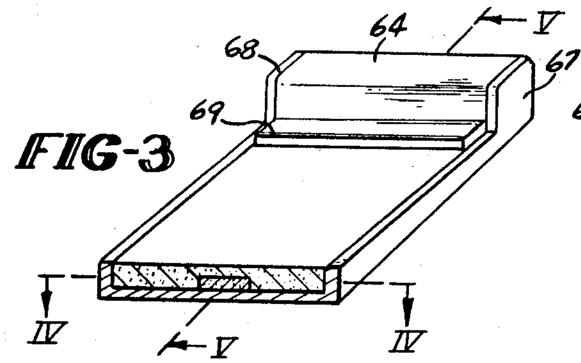
FIGURE 3 is a perspective view of the embodiment of FIGURE 2 in a subsequent stage of fabrication.
Figure 4:
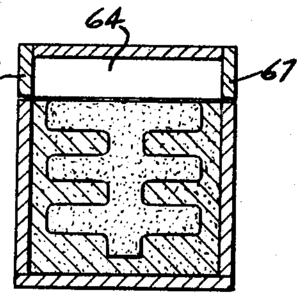
FIGURE 4 is a sectional view along the line IV—IV of FIGURE 3.
Figure 5:
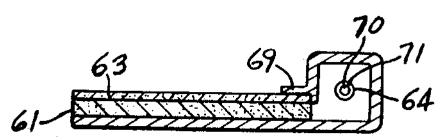
FIGURE 5 is a sectional view along the line V—V of FIGURE 3.

In accordance with an embodiment of this invention shown in FIGURE 1, these porous composite structures can be formed without deforming the sheet metal member. In accordance with one modification of this embodiment a first body 59 representing a sinterable permeable structure of relatively coarse porosity is provided on a face of a sheet metal member 60. Thereafter this first porous body is then encased within a second permeable body 61 superimposed on the same face of sheet metal member 60 with this second body having pores relatively finer than that of the first permeable body. The components of the resulting structure can be joined by sintering or in accordance with any of the above described joining methods. As a result a composite structure is formed which, in substance, comprises three layers as illustrated in FIGURE 2, namely a solid sheet metal component 60, a first pervious component 59, and a second porous component 61. The first pervious component 59 is characterized primarily by the fact that it is a pervious or porous body that offers substantially less resistance to flow than a porous component 61. The first pervious component 59 may be obtained by the sintering of metal particles having a size substantially larger than that used in the porous component 61. As will be obvious in producing a composite structure with such different grades of particulate metal care must be taken that the particles which are to form porous layer 61 do not pentrate and clog the interstices or void spaces in pervious component 59 at the time of fabrication. This may, for example, be prevented by admixing to the powdered metal which is to form the coarse component 59 a combustible or soluble substance, of the nature indicated in previous embodiments, so that the mixture of the two will form a voidless layer upon the solid sheet metal member 60. Upon sintering of the composite, the three layers will be metallurgically bonded to each other. If the void preserving substance in the pervious component 59 is combustible, then it will burn up in the course of sinterings; and if it is soluble, it may be leached out after the sintering operation.

It is noted that the pervious component 59 may be applied uniformly over the entire surface of the solid sheet metal component 60 and then in turn covered over its entire remaining exposed area with the porous component 61. Alternately, the pervious component 59 may be applied in a predetermined manner, as shown in FIGURE 1, and the second porous component 61 then applied thereover so that the second porous component 61 will be partly in contact with the first pervious component 59 and in other areas with the solid sheet metal component 60. It will be understood that the pervious component 59 may be produced in many other ways, as indicated in the previous embodiments, and the above example is intended only to serve merely as an illustration. For example, one may use any structural member that permits comparatively free flow of fluids in a cross-direction. Thus, one may fabricate strips of metal into a complex maze and attach it to the solid sheet metal component 60 by brazing. The second porous component 61 may be applied not only by the methods of powder metallurgy but also by casting or from wire mesh as indicated in the preceding embodiments, and the structures to be produced from such composites may take numerous shapes, each embodiment resulting in a structure that contains a region of low resistance to the flow of fluids, termed a pervious layer, bounded on one side by an impervious body, such as a solid sheet of metal, and on the other side by a porous layer having substantially higher resistance to flow. For example, the resistance to flow, as characterized by pressure drop across the respective layer, may be twice to several hundred times greater in the porous layer than it is in the pervious layer.

If it is desired to provide a channel in place of the pervious body 59 without deforming the solid metal component 60 as described in previous embodiments, then the body 59 above referred to as being made of particles producing coarse porosity may instead be made of a soluble or combustible substance around which the porous body 61 is formed as before. Upon sintering the porous body 61 is rendered cohesive within itself and is joined to the solid metal body 60, while the combustible substance will have been removed in the course of sintering, or the soluble substance, if used, remains in place during sintering but is removed thereafter by leaching. In either event, a composite body is formed consisting of a solid metal body 60 and a porous layer 61 which layer contains channels left after removal of the evanescent substance which channels are entirely within the porous body.

As will be understood, the selection of materials from which the porous and solid components are made to comprise the structures described herein and in the co-pending application, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the co-pending application, which catalysts may be non-metallic. The porous layer may also consist in part or entirely of glasses, carbides, nitrides, oxides, or borides, for example in instances calling for heat resistance, corrosion resistance or insulating properties not available in metals and alloys. The porous layer may also consist of synthetic polymeric substances, for similar reasons, as for example sintered porous fluoro-carbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Several of the embodiments described herein may be made advantageously of non-metallic components. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the co-pending applications.

In a modification shown in FIGURES 2 to 5, the preceding embodiments may be fabricated so as to adapt them to be provided with a manifold or header integral with the composite structure. In such a modification the porous component or components are provided on a face of a solid sheet metal component so as to dispose them in spaced relationship with the solid component. In this manner, the porous overlay does not extend over the full length or width of the solid sheet metal component so that an uncovered portion 62 is provided with dimensions appropriate to the purpose to be described below. Before or after the sintering operation necessary to attach the porous component to the solid component the uncovered portion 62 of the solid sheet member 60 is appropriately slit at 63 and blanked to adapt it to the formation of a manifold or header 64. Upon bending, tab portions 65 and 66 of the solid sheet metal member are folded over to form respective end walls 67 and 68 of the manifold or header 64. If desired the manifold structure may also be provided with a tab 69 disposed so as to cover a small portion of the external face of the porous composite. After bending of the solid component into manifold or header 64 and locating tab 60 in face-to-face relationship with the porous body, tab 69 may be welded to the porous body, or if the assembly is made before the heating operation, the tab may be integrated by metallurgical bonding during the sintering operation. Subsequent to the integration of the porous body, the header or manifold 64 may be adapted for the introduction of a fluid by the insertion of a conduit 70 within an opening 71 formed in an inwall, such as 68, of the manifold.

Figure 6:
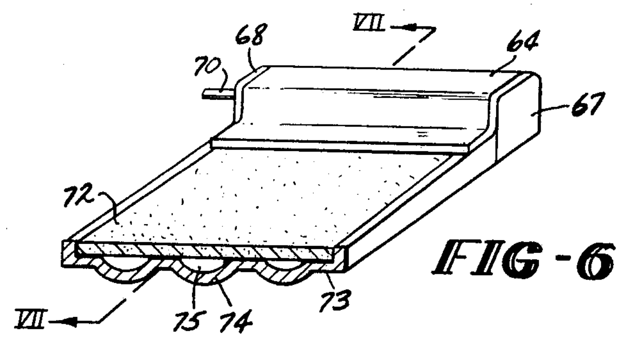
FIGURE 6 is a perspective view of a related embodiment of the present invention.
Figure 7:
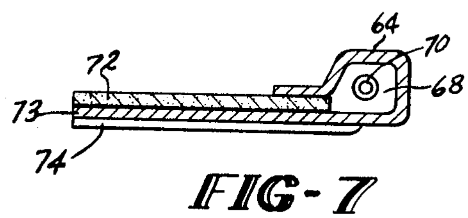
FIGURE 7 is a sectional view along the line VII—VII of FIGURE 6.

FIGURES 6 and 7 represent a still further modification of this embodiment wherein the fluid channels of the integrated composite assembly disposed between the porous component 72 and the solid sheet metal component 73 are formed by deformation or distention of portions of the solid sheet metal component 73 away from the porous component so as to form groove-like indentations 74 corresponding to the desired fluid channels 75.

Figure 8:
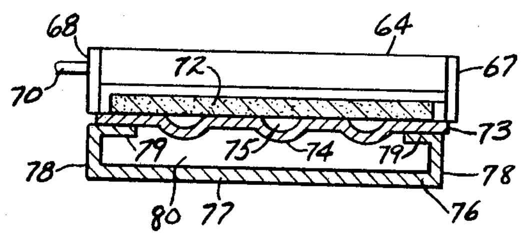
FIGURES 8 and 9 are sectional views of related embodiments of the present invention.

FIGURE 8 shows a still further modification of this embodiment adapted to place two fluids in heat exchange relationship with each other by means of the composite structure, one of the fluids being contained within a tubular structure 76 and the other within the channels and the porous layer of the composite structure. Tubular structure 76 may be formed from a trough-like structure comprised of a bottom wall 77 and side walls 78 having inwardly extending flanges 79 suitably secured by welding, brazing, and the like, to the external face of the solid sheet metal member 73. The resultant conduit 80 defined by the tubular structure 76 confines the fluid contained therein in a desired heat exchange relationship with the fluid contained in the porous composite structure of this embodiment.

Figure 9:
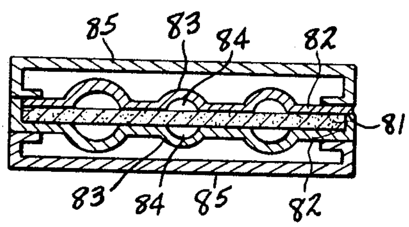

FIGURE 9 illustrates a still further embodiment of this invention adapting it to the provision of three fluid containing conduits. In this embodiment a porous composite structure is formed comprised of a sheet-like porous body 81 having superimposed and integrated to each of its opposite faces a solid sheet metal member 82 having predetermined portions thereof suitably deformed and distended into groove-like indentations 83 defining fluid containing channels 84. In a manner similar to the preceding embodiment, a channel forming member 85 is secured to the external faces of each of the solid sheet metal members 82.

As indicated above, the composite structures of this invention are adapted for many applications and particularly for use as heat exchangers. As is well known, tubular components used in heat exchangers were heretofore usually provided with fins, corrugations and other extensions of their surface so as to present an economic maximum extended surface area for a given weight of heat exchanger structure. However, such heat exchanger structures can be provided with greatly increased heat transfer surfaces by, i.e., heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the large surface area within the porous body, as defined by the innumerable interstices extending between the integrated particles of the porous body. For example for application in refrigerator systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

What is claimed is:

1. A method of making a sheet-like porous metal structure comprising metallurgically bonding a first sintered porous body of metal to a first portion of a face of an impervious sheet metal member, superimposing on said first porous body and on a second portion of said face a mass of particulate metal aggregate adapted to be sintered together to form a second body of metal of relatively less porosity than said first porous body, with said mass of metal aggregate being disposed on said sheet to embed said first body into said mass of metal aggregate, sintering said mass of metal aggregate to metallurgically bond the contacting metal surfaces of said aggregate to provide a second porous metal body metallurgically bonded to said first porous body and to said second portion of said face, adapting said first porous body to receive a fluid therein, and injecting said fluid under sufficient pressure into said first porous body to cause said fluid to flow through said first and said second porous bodies.

2. A method of making a sheet-like porous metal structure comprising forming a composite porous structure by embedding a first porous body in a second porous metal body of relatively less porosity with both said first and said second bodies having exposed surfaces extending in a common plane, superimposing said structure on a face of an imperforate metal sheet with said common surfaces disposed in confronting relationship with said face, metallurgically bonding said composite structure to said sheet at their interface, adapting said first porous body to receive a fluid therein, and injecting said fluid under sufficient pressure into said first porous body to cause said fluid to flow through said first and said second porous bodies.

References Cited

UNITED STATES PATENTS

| | | | |
|---|---|---|---|
| 2,267,918 | 10/1941 | Hildabolt | 29—182.3 X |
| 2,293,843 | 8/1942 | Maruin. | |
| 2,300,048 | 10/1942 | Koehring | 29—182.3 X |
| 2,772,180 | 11/1956 | Neel. | |
| 2,836,641 | 5/1958 | Vogt | 75—208 X |
| 2,845,346 | 7/1958 | Scanlon et al. | 75—208 |
| 2,946,681 | 7/1960 | Probst et al. | |
| 2,979,400 | 4/1961 | Mouwen | 29—182.2 X |
| 3,138,009 | 6/1964 | McCreight | 75—222 X |
| 3,226,263 | 12/1965 | Oswin | 75—22 X |
| 3,230,618 | 1/1966 | Valyi | 29—470.9 |
| 3,247,573 | 4/1966 | Noack | 29—155.5 |

JOHN F. CAMPBELL, *Primary Examiner.*

P. M. COHEN, *Assistant Examiner.*